Oct. 6, 1964　　　　HIDEO MIYAUCHI　　　　3,152,332
MOTION PICTURE FILM COUNTING MECHANISM
Filed Dec. 1, 1959　　　　　　　　　　　　2 Sheets-Sheet 1
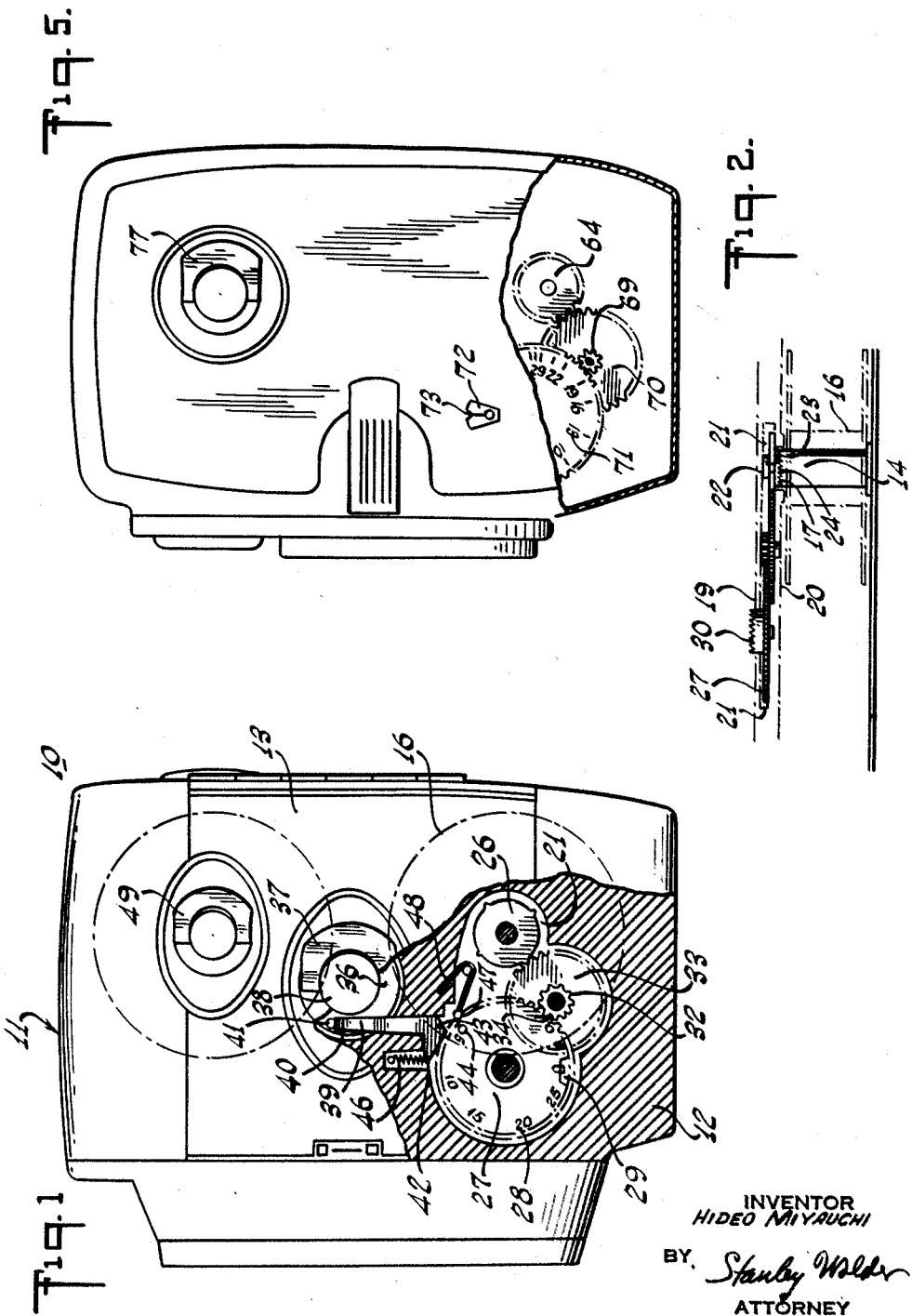
INVENTOR
*HIDEO MIYAUCHI*
BY *Stanley Wolder*
ATTORNEY

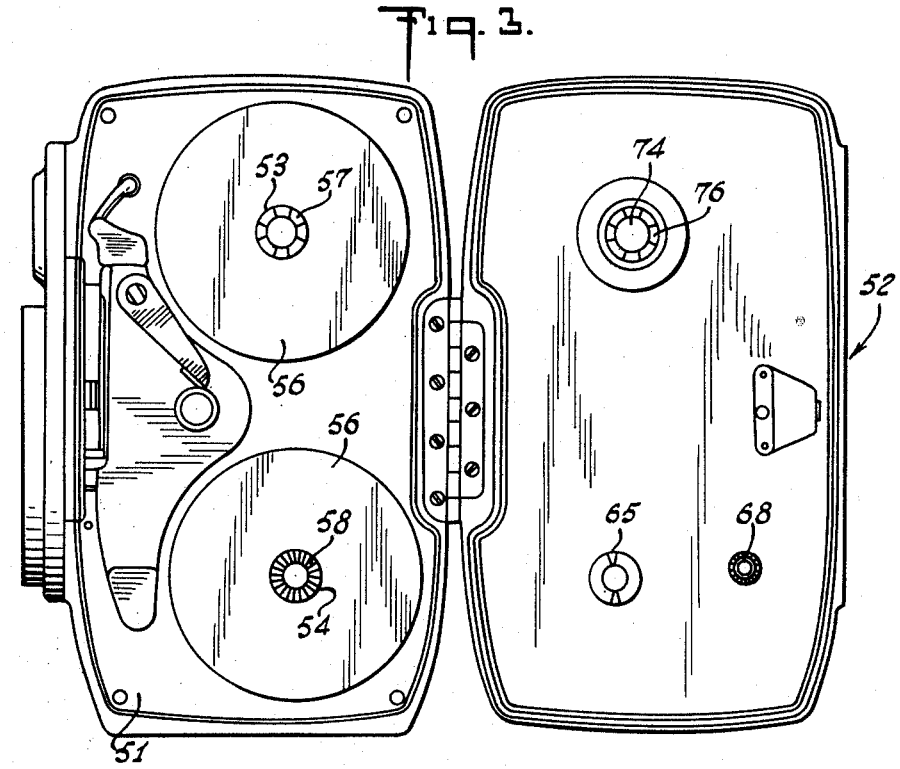
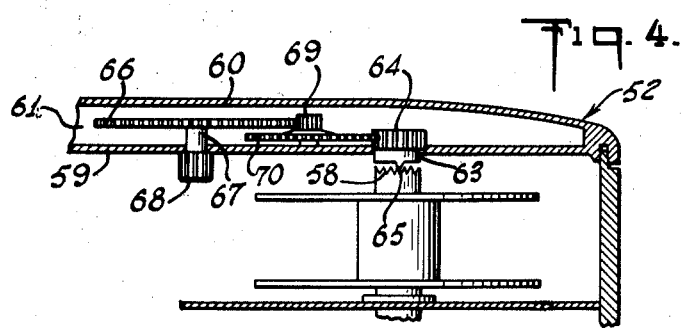

United States Patent Office 3,152,332
Patented Oct. 6, 1964

3,152,332
MOTION PICTURE FILM COUNTING
MECHANISM
Hideo Miyauchi, Okayo-shi, Nagano-ken, Japan, assignor to Yashica Co. Ltd., Tokyo, Japan, a corporation of Japan
Filed Dec. 1, 1959, Ser. No. 856,414
Claims priority, application Japan Dec. 5, 1958
8 Claims. (Cl. 352—172)

The present invention relates generally to improvements in motion picture cameras and it relates more particularly to a motion picture camera provided with an improved film counting mechanism.

The conventional motion picture camera is provided with a film counting wheel which furnishes an indication of the length of film which has been exposed thus permitting the employment of the complete roll of film. The counting wheel has been generally directly positively driven by the camera main drive motor and rotates at a fixed ratio to the revolutions of the drive motor. Inasmuch as the drive motor rotates in only one direction the counter wheel likewise rotates in only one direction. As a consequence the counter wheel, under many conditions of special photography such as in overlap photography, does not present an accurate indication of the amount of exposed film. This is a result of the fact that the counting wheel does not register any reverse transport of the film. Furthermore, the conventional film counting mechanism in motion picture cameras must be manually preset upon the reloading of the camera. Failure to effect such presetting occasions wrong information as to the film exposed and hence a waste of film. It is thus apparent that the film counting mechanisms heretofore employed in motion picture cameras possess numerous drawbacks and disadvantages and leave much to be desired.

It is therefore a principal object of the present invention to provide a motion picture camera having an improved film counting mechanism.

Another object of the present invention is to provide an improved motion picture camera provided with a film counting mechanism which accurately indicates the amount of film on the take up reel independently of the direction of movements of the film.

Still another object of the present invention is to provide a camera having an improved film counting mechanism which is automatically preset to its start position upon the reloading of the camera.

A further object of the present invention is to provide an improved camera of the above nature characterized by its simplicity, ruggedness, reliability and low cost.

The above and other objects of the present invention will become apparent from a reading of the following description taken in conjunction with the accompanying drawings wherein:

FIGURE 1 is a side elevational view partially broken away and partially in section of a motion picture camera embodying the present invention;

FIGURE 2 is a bottom fragmentary detail view of the improved counting mechanism;

FIGURE 3 is a side elevational view of another embodiment of the present invention, the camera being shown in open position;

FIGURE 4 is a fragmentary transverse sectional view of the camera, illustrating the film counting mechanism, the lid being shown in a closed position; and FIGURE 5 is a side elevational view, partially broken away of the camera with the lid in a closed position.

In a sense the present invention contemplates the provision of an improved motion picture camera comprising a casing including a lid movable between an open and closed position, a spindle located in said casing and adapted to engage a film reel and rotate therewith, a film footage indicator movably mounted on said lid, and a drive member mounted on said lid and connected to said indicator, said drive member releasably engaging said spindle when said lid is in closed position whereby to advance said indicator upon rotation of said spindle.

According to one form of the present invention the spindle is the film take up spindle and is provided with a toothed outer end face which, when the lid is in closed position, is releasably engaged by an eccentric detent mounted on the drive member. The drive member is connected by way of a speed reducing gear train to a rotatable counting wheel viewable through a window in the lid. In accordance with a preferred form of the subject device the drive member carries a star wheel which registers with the input gear of the gear train and intermittently advances this gear. The counter wheel is defined by a gear having a recess formed in the toothed periphery thereof. The output gear of the gear train cooperates with the counter wheel gear to advance the latter and is disengaged from the counter wheel gear when in registry with the peripheral recess therein. Means, actuated by the lid latching mechanism advances the counting wheel gear to carry the recessed portion past the output gear and into engagement therewith. Thus with the above arrangement, the counter wheel moves in a direction in accordance with the direction of advance of the film and is automatically set to its zero position upon the reloading of the camera thereby overcoming many of the advantages and drawbacks of the conventional film counting mechanism.

Referring now to the drawings and more particularly to FIGURES 1 and 2 thereof which illustrate a preferred embodiment of the present invention, the reference numeral 10 generally designates the improved camera which comprises a casing 11 including a body member 12 and a lid 13 hinged to a rear edge of the body member 12 and swingable between an open and closed position to permit the reloading of the camera. Disposed in the body member 12 are a take up shaft or spindle 14 and a feed spindle each of the spindles being adapted to releasably engage the hub of a film reel 16 and rotate therewith. The take up spindle 14 is frictionally driven by the camera drive motor which concurrently drives the film frame advancing mechanism and the camera shutter in conventional fashion and the feed spindle is relatively freely rotatable. The free end faces of the take up and feed spindles are radially serrated or toothed as at 17.

The lid 13 includes an outer wall 19 and a spaced inner wall 20 defining a cavity 21 between them which houses the film counting mechanism. The film counting mechanism includes a rotatable drive member 22 suitably journalled in the lid cavity 21 and comprising an inner hub portion 23 provided with one or more eccentrically mounted inwardly directed detents 24 which engage the spindle serrated end face 17 when the lid 13 is in closed position. Concentric with the hub 23 is a star wheel 26 defined by a disc provided with a small number of regularly widely spaced outwardly directed teeth. Also located in the lid cavity 21 and laterally spaced from the drive member 22 is a gear defining rotatable counter wheel 27, carrying indicia 28 which are viewable through a window 29 formed in the lid outer wall 19 and in registry with the border of the counter wheel 27. A knob or finger piece 30 axially projects from the counter wheel 27 through an aligned opening in the lid outer wall 19 and permits the manual rotation of the counter wheel 27.

A speed reducing gear train is located in the lid cavity 21 and includes a small pinion gear 32 which normally engages the gear 27 and a large spur gear 33 coaxial and rotatable with the pinion gear 32 and in mating registry with the star wheel 26. Thus rotation of the star wheel 26 and drive member 22 rotates the spur gear small successive increments in accordance with the number of teeth on the star wheel 26, and the counter wheel gear 27 is rotated at a still slower speed by reason of the coupling speed reducing gear train. When the gear 33 registers with a space between successive teeth in the star wheel 26 the counter wheel may be freely rotated without rotation of the drive member 22. Furthermore, it should be noted that a recess 34 represented by an absence of gear teeth is formed in the periphery of the counter wheel gear 27 so that when the recess 34 registers with the pinion gear 32 the drive member 22 may rotate without rotating the counter wheel 27.

The lid 13 is provided with a latching arrangement which permits the releasable locking of the lid 13 in closed position and which includes a rockable disc 36 located within the lid cavity 21 and connected to an externally located finger piece 37 by means of a journalled shaft 38. A plunger member 39 is slidably disposed in the lid cavity 21 and comprises an elongated rear leg 40 having a trailing end in abutting engagement with a pin 41 eccentrically mounted on the disc 36 and a transversely extending front section 42 provided with a cam defining inclined leading edge 43. A pin 44 is eccentrically mounted on the wheel 27 and is in alignment with the leading end of the cam edge 43 when the gear recess 34 registers with the pinion gear 32. A helical tension spring 46 is connected between the plunger section 42 and a stationary pin to resiliently urge the plunger member 39 to its upper retracted position. Thus the rotation of the wheel 27 is not normally impeded by the member 39 when the wheel gear 27 is out of engagement with the pinion gear 32, upon depletion of the film, it is subsequently brought into engagement therewith upon manipulation of the latching mechanism attendant to the reloading of the camera which slides the plunger 39 downwardly, brings the cam edge 43 to bear upon the pin 44 and advances wheel 27 a predetermined increment to its zero position in engagement with the pinion gear 32. In order to prevent the accidental movement of the wheel 27 there is provided a detent roller 47 which is resiliently urged into peripheral contact with the wheel gear 27 by a suitably mounted hairpin spring 48. The lid 13 also carries an externally located rewinding knob 49 which is coupled to a detent carrying drive member similar to the drive member 22 which releasably engages the serrated end of the feed spindle when the lid 13 is in closed position.

In employing the improved camera described above a roll of film may be loaded in the camera in the usual manner after opening the lid 13. Prior to the opening of the lid 13 the counter wheel recess 34 registers with the pinion gear 32 and is advanced out of registry therewith upon the unlatching of the lid 13 by manipulating the knob 37 in the manner previously set forth. Following the reloading of the camera the lid 13 is closed bringing the drive members into engagement with the respective spindles. The camera drive motor is then actuated to rotate the spindle 14, which rotates therewith the star wheel carrying drive member 22. The star wheel 26 intermittently advances the gear 33 which slowly advances the counter wheel 27 by way of the pinion gear 32 thereby providing an indication of the film taken up by the reel 16. By manipulation of the knob 49 any desired length of film may be rewound. The rewinding of film causes a rotation of the spindle 14 in a reverse direction driving the counter wheel 27 backwards so that a true indication of the position of the film is always provided. The counter wheel 27 may be adjusted, if desired, by way of the finger piece 39, since it is easily rotatable by reason of the star wheel 26 only intermittently engaging the spur gear 33. Upon the film being substantially depleted the wheel recess 34 registers with the pinion gear 32 stopping further advance thereof until the camera is reloaded as aforesaid.

In FIGURES 3 to 5 of the drawing there is illustrated another embodiment of the present invention, which like the earlier described embodiment includes a casing body member 51 and a hinged lid 52. Disposed in the body member 51 are a feed spindle 53 and a take-up spindle 54 driven in the manner earlier set forth, the spindles 53 and 54 releasably carrying film reels 56 and being provided with free end faces 57 and 58 respectively, each having radially extending serrations.

The lid 52 has inner and outer walls 59 and 60 which enclose a counter mechanism housing cavity 61. The counting mechanism includes a drive member 63 journalled in the lid wall 59 and including a drive gear 64 located in the cavity 61 and a hub provided with a pair of depending detents 65 which releasably engage the spindle end face 58 when the lid 52 is in closed position. A counting wheel defining gear 66 is also located in the cavity 61 and is mounted on a shaft 67 projecting through and journalled in the lid wall 59 and terminating in a knob 68. The drive gear 64 is coupled to the gear 66 by way of a speed reducing gear train including coaxially affixed pinion gear 69 and a relatively larger spur gear 70, the pinion gear 69 meshing with the gear 66 and the spur gear 70 meshing with the smaller drive gear 64. The counter wheel defining gear 66 carries suitable footage indicia 71 which are viewable through a window 72 formed in the lid wall 60 and provided with an indicator 73. A rewind drive member 74 projects inwardly from the lid wall 59 and includes a serrated end face 76 which releasably engages the feed spindle serrated end face 57 when the lid 52 is in closed position. The drive member 74 is connected to a mainpulating knob 77 located on the outer face of the lid 52.

In loading the camera the lid 52 is opened, reels 56 are placed on the spindles 53 and 54 and the film threaded in the usual manner. The counter wheel 66 is then rotated to its start position by means of the knob 68 and the lid 52 closed to bring the drive members 63 and 74 into engagement with the spindles 54 and 53. Thus upon advance of the take up spindle 54 by the camera motor the counter wheel 66 is correspondingly advanced to provide information as to the length of film on the take up reel. By rotation of the knob 77 any desired length of film may be rewound and the counter wheel 66 is rotated in a reverse direction a corresponding amount by the reverse rotation of the spindle 54.

While there have been described and illustrated preferred embodiments of the present invention it is apparent that numerous alteration, additions and omissions may be made without departing from the spirit thereof as defined in the claims.

What is claimed is:

1. A motion picture camera comprising a casing including a lid movable between an open and closed position, a driven take-up spindle and a freely rotatable feed spindle located in said casing and adapted to engage film reels and rotate therewith, a winding member mounted on said lid and adapted to releasably engage said feed spindle when said lid is in closed position, a film footage indicator movably mounted on said lid relative to a fixed point thereon, a drive member mounted on said lid and connected to said indicator, said drive member releasably engaging said take-up spindle when said lid is in closed position whereby to advance said indicator upon rotation of said take-up spindle, and being out of engagement with said take-up spindle when said lid is in open position, and an indicator adjusting member connected to said indicator and disposed and accessible only at the underface of said lid.

2. A motion picture camera comprising a casing including a lid movable between an open and closed position, a positively driven take-up spindle and a freely rotatable feed spindle located in said casing and adapted to engage film reels and rotate therewith, a winding member mounted on said lid and adapted to releasably engage said feed spindle when said lid is in closed position, a film counter wheel rotatably mounted on said lid, a rotatable drive member mounted on said lid and connected to said counter wheel, said drive member releasably engaging said take-up spindle when said lid is in closed position whereby to rotate said counter wheel upon rotation of said spindle and being out of engagement with said take-up spindle when said lid is in open position, and an adjusting member connected to said counter wheel and disposed and accessible only at the underface of said lid.

3. A motion picture camera comprising a casing including a lid movable between an open and closed position, a positively driven take-up spindle and a freely rotatable feed spindle located in said casing and adapted to engage film reels and rotate therewith, a winding member mounted on said lid and adapted to releasably engage said feed spindle when said lid is in closed position, a film counter wheel rotatably mounted on said lid, a rotatable drive member mounted on said lid and releasably engaging said take-up spindle when said lid is in closed position and being out of engagement with said take-up spindle when said lid is in open position, a speed reducing mechanism connecting said drive member to said counter wheel, and an adjusting member connected to said counter wheel and disposed and accessible only at the underface of said lid.

4. A motion picture camera comprising a casing including a lid movable between an open and closed position, a driven take-up spindle and a freely rotatable feed spindle located in said casing and adapted to engage film spools and rotate therewith, a winding member mounted on said lid and adapted to releasably engage said feed spindle when said lid is in closed position, a film counter wheel rotatably mounted on said lid and having a first gear connected thereto, a rotatable drive member carrying a second gear and mounted on said lid and releasably engaging said take-up spindle when said lid is in closed position and being out of engagement with said take-up spindle when said lid is in open position, a speed reducing gear train connecting said first and second gears, and an adjusting member connected to said counter wheel and disposed and accessible only at the underface of said lid.

5. A motion picture camera in accordance with claim 4 wherein said take-up spindle is provided with an outwardly directed serrated free end face and said drive member is provided with an eccentrically located detent engaging said serrated end face when said lid is in closed position.

6. A motion picture camera comprising a casing including a lid movable between an open and closed position, a spindle located in said casing, a film reel engaging said spindle and rotatable therewith, a film footage indicator movably mounted on said lid relative to a fixed point thereon, a drive member mounted on said lid and drive coupled to said indicator, said drive member releasably engaging said spindle when said lid is in closed position whereby to advance said indicator upon rotation of said spindle and being disengaged from said spindle when said lid is in open position, and an indicator adjusting element connected to said indicator and disposed and accessible only at the underface of said lid.

7. A motion picture camera comprising a casing including a lid movable between an open and closed position, a spindle located in said casing and adapted to engage a film reel and rotate therewith, a film counter wheel rotatably mounted on said lid, a rotatable drive member mounted on said lid and engaging said spindle when said lid is in closed position and released from said spindle when said lid is in open position, a speed reducing mechanism connecting said drive member to said counter wheel and a counter wheel adjusting element connected to said counter wheel and disposed along and accessible only at the underface of said lid.

8. The camera of claim 7 wherein said speed reducing mechanism includes a star wheel connected to said drive member and a gear coupled to said star wheel and connected to said counter wheel.

References Cited in the file of this patent

UNITED STATES PATENTS

| 957,246 | Paulson | May 10, 1910 |
| 2,229,848 | Harter et al. | Jan. 28, 1941 |
| 2,238,482 | Wittel | Apr. 15, 1941 |
| 2,585,451 | Frankel | Feb. 12, 1952 |
| 2,632,369 | Estes | Mar. 24, 1953 |

FOREIGN PATENTS

| 236,398 | Switzerland | June 16, 1945 |